(12) United States Patent
Sorotokin et al.

(10) Patent No.: US 9,325,680 B2
(45) Date of Patent: Apr. 26, 2016

(54) DIGITAL RIGHTS MANAGEMENT RETRIEVAL SYSTEM

(75) Inventors: Peter Sorotokin, Cupertino, CA (US); James Lester, Dublin, CA (US)

(73) Assignee: Adobe Systems Incorporated, San Jose, CA (US)

(*) Notice: Subject to any disclaimer, the term of this patent is extended or adjusted under 35 U.S.C. 154(b) by 1284 days.

(21) Appl. No.: 12/454,288

(22) Filed: May 15, 2009

(65) Prior Publication Data

US 2014/0289515 A1 Sep. 25, 2014

(51) Int. Cl.
*H04L 29/06* (2006.01)
*H04L 9/32* (2006.01)
*G06F 21/10* (2013.01)

(52) U.S. Cl.
CPC ............. *H04L 63/08* (2013.01); *G06F 21/10* (2013.01); *H04L 9/3263* (2013.01); *H04L 63/123* (2013.01); *H04L 2209/603* (2013.01); *H04L 2463/101* (2013.01)

(58) Field of Classification Search
USPC .......................................................... 713/162
See application file for complete search history.

(56) References Cited

U.S. PATENT DOCUMENTS

| 6,611,812 | B2* | 8/2003 | Hurtado et al. ................ 705/51 |
| 2002/0198846 | A1* | 12/2002 | Lao .................................. 705/54 |
| 2006/0170759 | A1* | 8/2006 | Roever et al. ............. 348/14.03 |
| 2007/0250573 | A1* | 10/2007 | Rothschild ................... 709/205 |
| 2008/0147556 | A1* | 6/2008 | Smith et al. .................... 705/57 |
| 2010/0031310 | A1* | 2/2010 | Konetski et al. ................. 726/1 |

* cited by examiner

*Primary Examiner* — Esther B Henderson
(74) *Attorney, Agent, or Firm* — Kilpatrick Townsend & Stockton LLP

(57) ABSTRACT

A digital rights management retrieval system is provided. In some embodiments, a digital rights management system includes receiving a first notification from a first client device of a first protected content transaction for a first user with a first content distributor, wherein the first notification includes a first network address for the first content distributor; receiving a second notification from the first client device of a second protected content transaction by the first user with a second content distributor, wherein the second notification includes a second network address for the second content distributor; and maintaining a first list of content distributors for the first user, wherein the first list includes a network address for each content distributor from which the first user has downloaded protected content.

21 Claims, 11 Drawing Sheets

DIGITAL RIGHTS MANAGEMENT RETRIEVAL SYSTEM

BACKGROUND OF THE INVENTION

With networks such as the Internet and various mobile networks gaining increasing popularity, more and more digital media content can be downloaded by users from a wide array of digital media content sources. To protect intellectual property rights, content producers and/or distributors often employ various types/forms of digital rights management (DRM) schemes to protect their digital content (e.g., protected content). Typically, if a user downloads protected content, the user can also acquire a license that includes a key to unlock the protected content before the content becomes readable, viewable, playable and/or otherwise accessible.

BRIEF DESCRIPTION OF THE DRAWINGS

Various embodiments are disclosed in the following detailed description and the accompanying drawings.

DETAILED DESCRIPTION

Figure 1:
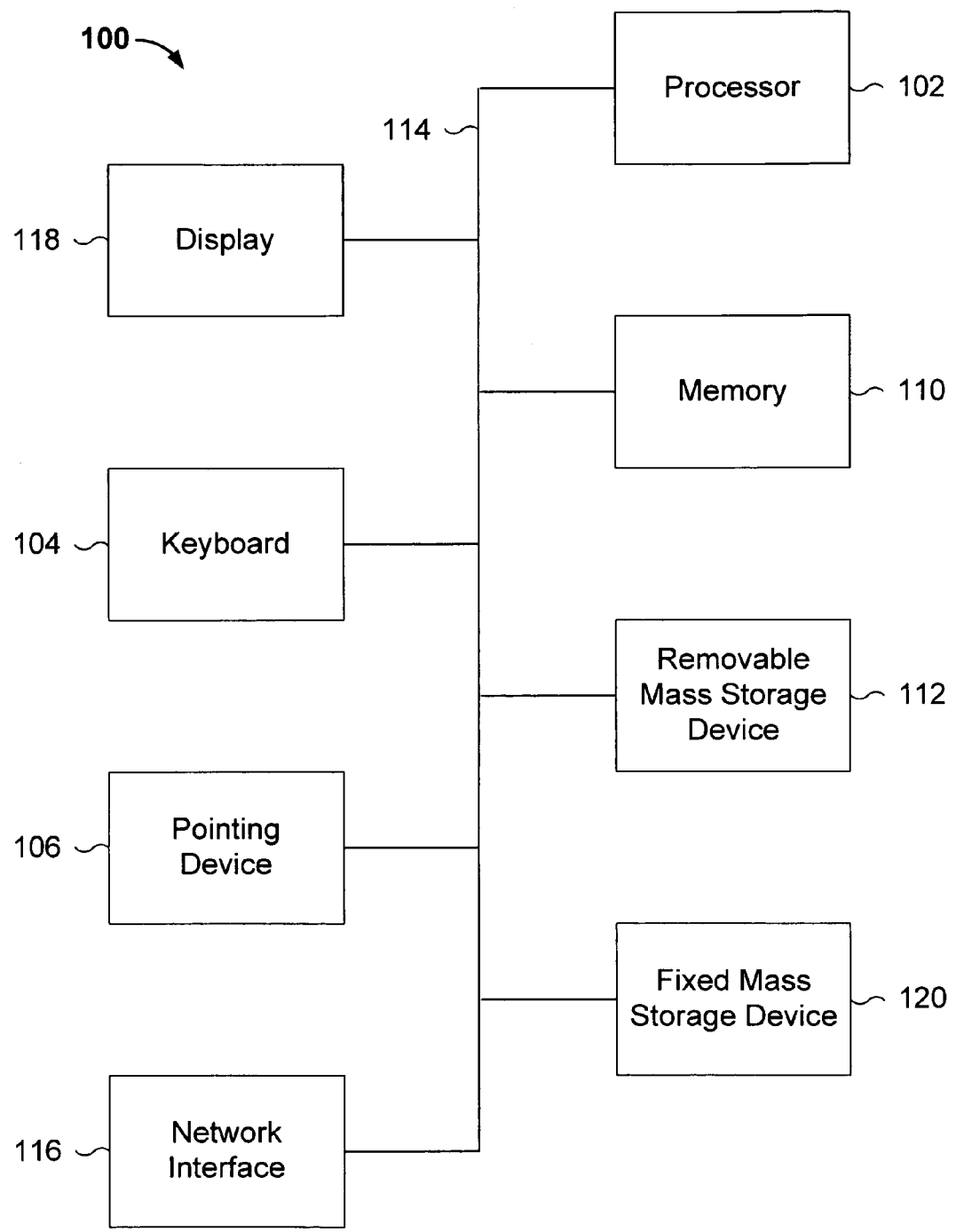
FIG. 1 is a functional diagram illustrating a programmed computer system for executing a digital rights management retrieval system in accordance with some embodiments.

Various embodiments can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the various approaches of the various embodiments disclosed herein may take, may be referred to as techniques. In general, the order of the steps of disclosed processes may be altered within the scope of the techniques. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments is provided below along with accompanying figures that illustrate the principles of the techniques. The techniques are described in connection with such embodiments, but the techniques are not limited to any embodiment. The scope of the techniques is limited only by the claims and the techniques encompass numerous alternatives, modifications and equivalents. Numerous specific details are set forth in the following description in order to provide a thorough understanding of the techniques. These details are provided for the purpose of example and the techniques may be practiced according to the claims without some or all of these specific details. For the purpose of clarity, technical material that is known in the technical fields related to the techniques has not been described in detail so that the techniques are not unnecessarily obscured.

To protect intellectual property rights, content producers and/or distributors often employ various types/forms of digital rights management (DRM) schemes to protect their digital content (e.g., protected content). Typically, if a user downloads protected content, the user can also acquire a license that includes a key to unlock the protected content before the content becomes readable, viewable, playable, and/or otherwise accessible.

Digital rights management (DRM) schemes can typically be classified as either "distributed" or "centralized" schemes/solutions. For example, for distributed schemes, a DRM provider supplies a DRM solution to any of a number of content producers and/or distributors who can issue licenses to any number of users. In this example, the DRM provider has no involvement beyond the initial supplying of the DRM solution. For centralized schemes, the DRM provider can supply the DRM solution, as similarly discussed above with respect to distributed schemes, and can also serve as the sole content distributor and as the sole issuer of licenses to users.

Each approach provides benefits and disadvantages. For example, a centralized solution allows the DRM provider to have complete control over license and content distribution. However, this approach may have the disadvantage of discouraging other content producers or distributors from participating in the centralized scheme. Content producers and distributors may be more likely to participate in distributed solutions, but, as previously mentioned, such a solution may not allow the DRM provider to be involved beyond supplying the initial DRM solution.

Various embodiments described herein may comprise solutions that may provide for continuing involvement on the part of the DRM provider in the licensing process, and may also provide for the participation of any number of content distributors and/or content providers. In some embodiments, at least in part in response to receiving a license request from a user, a content distributor delivers an unsigned license to a DRM provider, and the DRM provider returns a signed license to the content distributor. The content distributor fulfills the user's license request by transmitting the signed license to the user's client device, and the user's client device reads or otherwise accesses a protected digital object according to permissions included in the license. In this manner, the DRM provider can be involved in each license grant, allowing an amount of continuing control over the licensing process, while allowing participation of any number of content distributors and/or content providers/producers.

Various DRM schemes can also facilitate the distribution of protected digital content (e.g., protected content includes any digital content that is protected using any form of DRM scheme, such as e-book, digital music, digital video, digital photograph, multimedia, documents, and any other digital content). For example, for distributed schemes, a DRM provider supplies a DRM solution to any of a number of content providers/producers and/or content distributors (e.g., protected content vendors) who can issue licenses to any number of users. Protected content vendors typically allow users to retrieve (e.g., redownload) previously purchased protected content (e.g., previously purchased and previously downloaded protected content). For example, a user will often purchase various protected content from a number of different protected content vendors. However, when the user needs to retrieve certain of their previously purchased content (e.g., to redownload to the same or another client device), the user is required to know which protected content vendor(s) from which the user purchased that previously purchased protected content, and the user is also required to know the user's account information for that protected content vendor(s) (e.g., vendor specific user account information), in which the user then must retrieve/redownload that previously purchased content through, for example, the web based vendor storefront for each of the protected content vendor(s) using their vendor specific user account information.

Accordingly, a digital rights management retrieval system is provided. For example, using various embodiments of the digital rights management retrieval system disclosed herein, the user can retrieve (e.g., redownload) their previously purchased content using a single set of credentials (e.g., centrally assigned user account information and a centrally assigned set of credentials for the user, in which it is assigned by, for example, a central DRM service/software solution provider, such as Adobe Systems Incorporated or any other entity). Moreover, the user is not required to know which protected content vendor(s) from which the user purchased their previously purchased protected content, and the user is not required to know or maintain any vendor specific user account information or vendor specific credentials. For example, the user can retrieve (e.g., redownload) their previously purchased content using a single set of credentials, in which the user can be authenticated with each of the protected content vendors using a centrally assigned private key and a digital certificate (e.g., a signed certificate, which is signed using the private key). In some embodiments, a digital rights management system includes receiving a first notification from a first client device of a first protected content transaction for a first user with a first content distributor, wherein the first notification includes a first network address for the first content distributor; receiving a second notification from the first client device of a second protected content transaction by the first user with a second content distributor, wherein the second notification includes a second network address for the second content distributor; and maintaining a first list of content distributors for the first user, wherein the first list includes a network address for each content distributor from which the first user has downloaded protected content. In some embodiments, the digital rights management retrieval system can be provided using a protected content software solution (e.g., Adobe® Digital Editions®) or any other solution that can support, for example, a distributed DRM system that provides for centralized user credentials that can be recognized by multiple protected content vendors.

FIG. 1 is a functional diagram illustrating a programmed computer system for executing a digital rights management retrieval system in accordance with some embodiments. As shown, FIG. 1 provides a functional diagram of a general purpose computer system programmed to provide a digital rights management retrieval system in accordance with some embodiments. As will be apparent, other computer system architectures and configurations can be used to perform digital rights management retrieval. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide the functionality as shown in and described below with respect to FIGS. 2 through 7 (e.g., client device 210, DRM provider 230, activation server 330, licensing server 340, and/or system 500) and/or executes/performs the processes described below with respect to FIGS. 8 through 11.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions (e.g., programmed instructions). For example, primary storage devices 110 can include any suitable computer-readable storage media, described below, depending on whether, for example, data access needs to be bidirectional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110 (e.g., RAM) as virtual memory.

In addition to providing processor 102 access to storage subsystems, bus 114 can be used to provide access other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions), from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
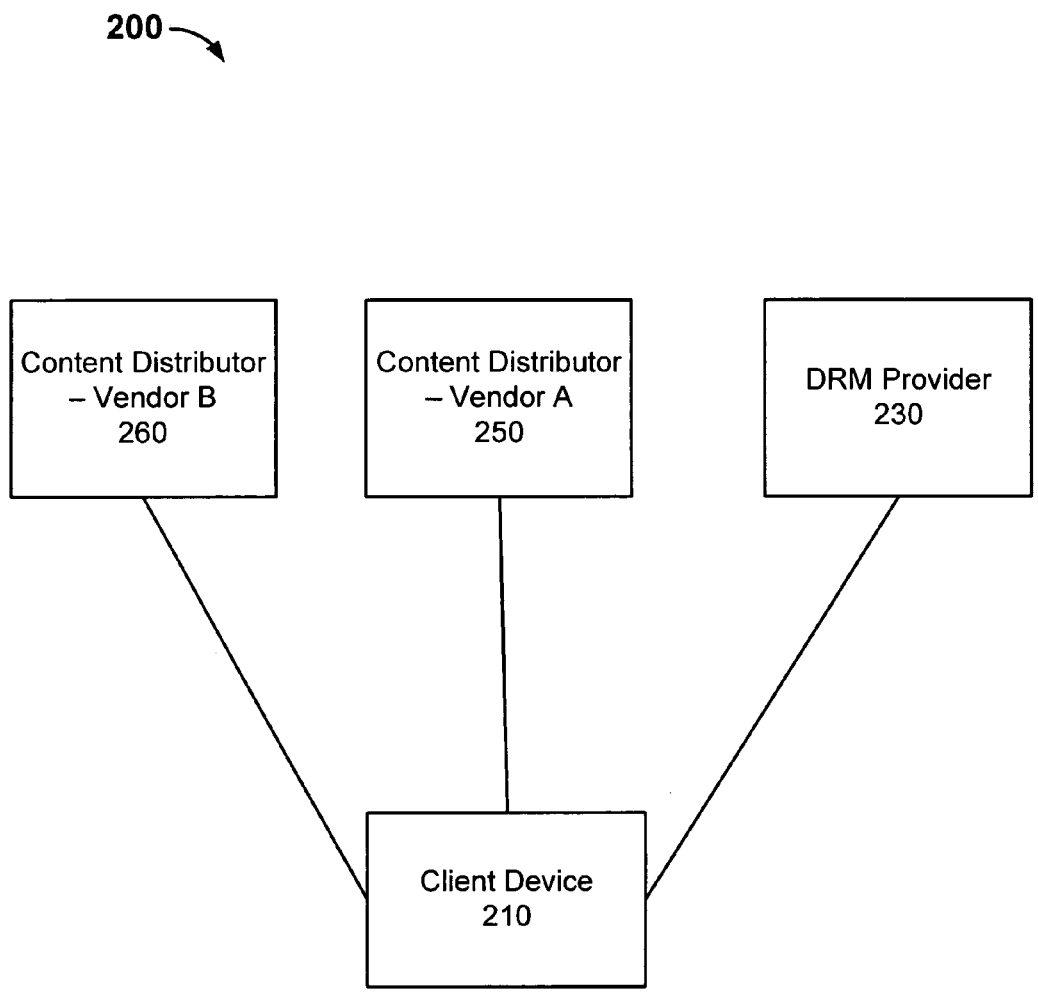
FIG. 2 is a functional diagram illustrating a digital rights management retrieval system in accordance with some embodiments.

FIG. 2 is a functional diagram illustrating a digital rights management retrieval system in accordance with some embodiments. As shown, a digital rights management retrieval system 200 includes a client device 210 in network communication (e.g., via the Internet, a cellular/mobile/wireless network or any other network) with a DRM provider 230. Also, the client device 210 is in communication (e.g., network communication, such as via the Internet, a cellular/mobile/wireless network or any other network) with a content distributor (e.g., protected content vendor A) 250 and a content distributor (e.g., protected content vendor B) 260, and the client device can request/purchase protected content from the content distributors 250 and 260. In some embodiments, the client device 210 is in network communication with more than two content distributors from which the client device 210 can request/purchase protected content.

In some embodiments, the client device 210 is a computer system that executes the client software for the digital rights management retrieval system 200 (e.g., programmed processor 102 and/or programmed computer system 100, or any other computing device, such as a mobile phone, smart phone, PDA, netbook, laptop, computer desktop, entertainment/gaming device, music player device, personal navigation device, and/or video player device). In some embodiments, the content distributors 250 and/or 260 include a web server, on which is stored, for example, protected content available for purchase and/or download by users. For example, the client device 210 can download protected content from content distributor 250 and/or 260.

In some embodiments, the protected content is encrypted and/or otherwise protected, such that the client device 210 can read or otherwise access the protected digital object only through the use of a license obtained from the content distributor. In some embodiments, the DRM provider 230 supplies a protected content reader application to the client device 210 (as shown in and discussed below with respect to FIG. 3). For example, the reader application determines whether an appropriate license has been obtained before allowing the user to view or otherwise utilize the protected content.

Figure 3:
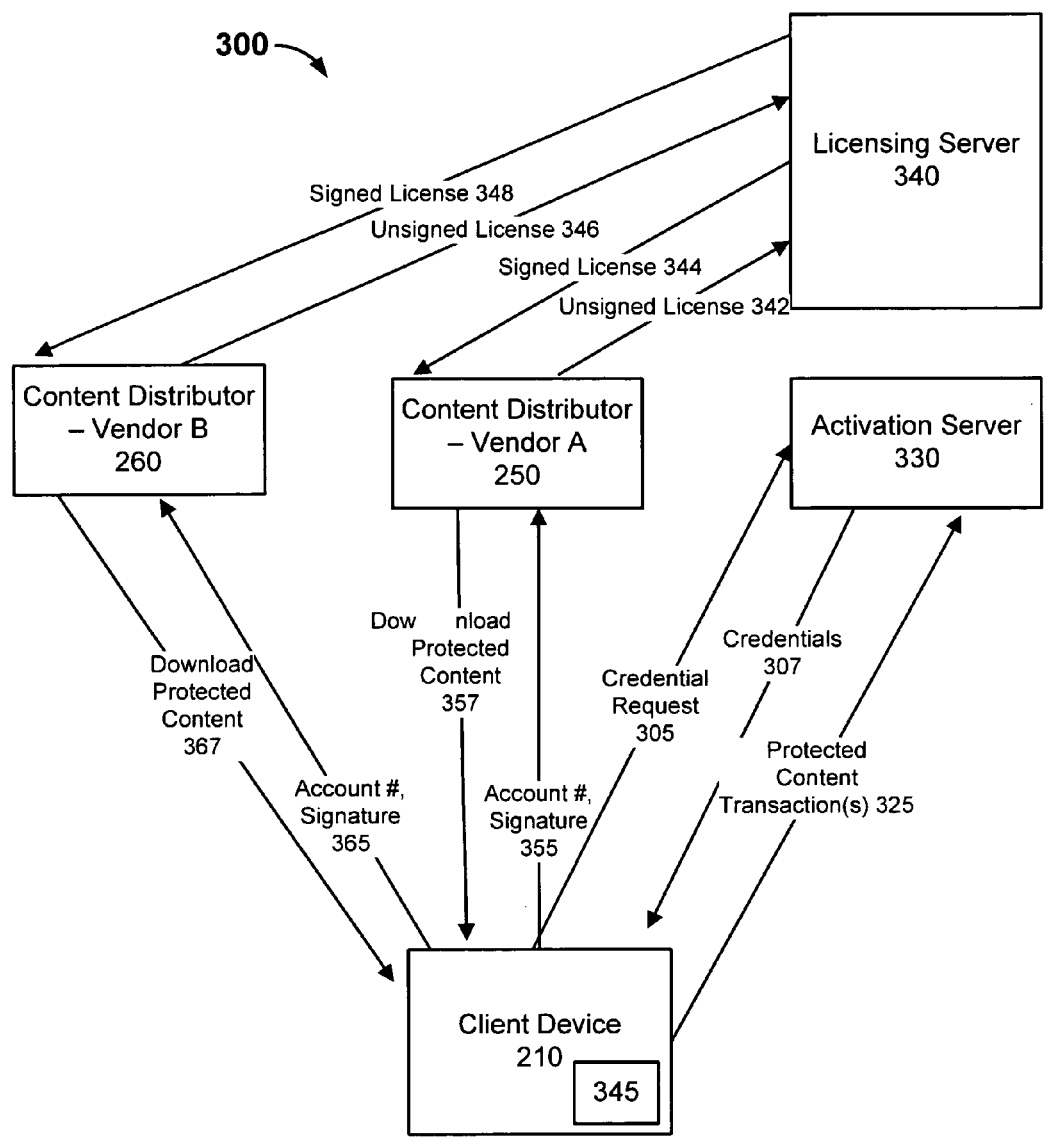
FIG. 3 is another functional diagram illustrating a digital rights management retrieval system in accordance with some embodiments.

FIG. 3 is another functional diagram illustrating a digital rights management retrieval system in accordance with some embodiments. As shown, a digital rights management (DRM) retrieval system 300 includes a client device 210 in communication (e.g., network communication) with an activation server 330. The client device 210 sends a credentials request 305 to the activation server 330. The credentials request 305 is a request for a first set of credentials for a first user of the client device 210. In some embodiments, the credentials request 305 includes an indication for establishing an identity of the first user. In some embodiments, the credentials request 305 includes one or more of the following for establishing an identity of the first user: a user ID and password, a biometric indication, a smart card, and a digitally signed statement issued by a trusted third party (e.g., a SAML token). In some embodiments, the activation server 330 verifies the credentials request (e.g., verifying that the provided indication properly establishes the identity of the first user). In some embodiments, the activation server 330 generates the first set of credentials. As shown, the activation server 330 sends the first set of credentials 307 to the client device 210. In some embodiments, the first set of credentials includes an account number and a digital certificate, and, in some embodiments, the digital certificate includes a public key/private key pair.

For example, instead of the user navigating to and through various vendor storefronts using various vendor-specific credentials for the user, the user can use the first set of credentials 307, which is centrally assigned, as similarly discussed above. In some embodiments, the first set of credentials includes a digital certificate and a public/private key pair, which are generated by a central activation server, such as the activation server 330. For example, the client device 210 can use the digital private key and the digital certificate to authenticate itself with various content distributors (e.g., using a signed digital certificate). In some embodiments, a content distributor can also be a content provider.

As shown in FIG. 3, the client device 210 is also in communication (e.g., network communication) with a content distributor (Vendor A) 250 and another content distributor (Vendor B) 260. For example, the client device 210 can download (e.g., purchase through an electronic transaction and download) protected content from various content distributors, such as the content distributors 250 and 260. In some embodiments, the client device 210 uses at least a portion of the first set of credentials for the first user for performing a plurality of protected content download transactions with various content distributors. In some embodiments, the content distributors 250 and 260 each have web based stores (e.g., web site based stores for protected content download/purchase transactions) that require users to log in to authenticate the users for access to protected content for purchase/download to the users' respective, activated client devices. As shown, the first user of the client device 210 logs into the protected content web site of the content distributor 250 by providing the first user's account number and signed digital certificate 355. In some embodiments, other information is provided for logging into the protected content web site of the content distributor 250, including, for example, at least a portion of the first set of credentials. Protected content selected/purchased for download can then be downloaded as shown at 357. Similarly, the client device 210 is logged into the protected content web site of the content distributor 260 by providing the first user's account number and signed digital certificate 365, and protected content selected/purchased for download can then be downloaded as shown at 367.

In some embodiments, for each protected content transaction and/or each protected content transaction with a new content distributor (e.g., content distributors 250 and 260), the client device 210 sends a notification of protected content transaction(s) 325 to the activation server 330. In some embodiments, the notification of protected content transaction(s) 325 includes a network address for the content distributor for such protected content transaction(s). In some embodiments, the activation server 330 maintains a first list of content distributors for the first user, in which the first list includes a network address (e.g., a uniform resource locator (URL)) for each content distributor from which the first user has downloaded/purchased protected content (e.g., associated with the first user's account number). In some embodiments, the activation server 330 maintains such lists for each user's downloaded/purchased protected content activities.

In some embodiments, during (and/or after) protected content fulfillment (e.g., a request to download protected content) with a new protected content distributor, the client device 210 (e.g., content management software executed on/performed by the client device) communicates with the activation server 330 (e.g., a centralized activation/DRM server) to report a new protected content distributor from which protected content is being downloaded/purchased. In some embodiments, the activation server 330 includes and/or is in communication with, for example, a database that maintains lists for each user's downloaded/purchased protected content activities, as discussed below with respect to FIG. 5.

As shown in FIG. 3, a licensing server 340 is communication (e.g., network communication) with the content distributors 250 and 260. For example, when the client device 210 selects/purchases for download protected content from the content distributor 250, the content distributor 250 sends an unsigned license 342 for that digital content to the licensing server 340. The licensing server 340 sends a signed license 344 to the content distributor 250. Similarly, when the client device 210 selects/purchases for download protected content from the content distributor 260, the content distributor 260 sends an unsigned license 346 for that digital content to the licensing server 340, and the licensing server 340 sends a signed license 348 to the content distributor 260.

In some embodiments, content distributors 250 and/or 260 maintain copies of these signed licenses for the first user of the client device 210 (e.g., the licensing server signing may include a transactional fee that is charged to the content distributors, which creates an incentive for the content distributors to archive copies of such signed licenses for retrieval if needed, such as for redownload requests, as discussed herein). In some embodiments, the DRM provider 230 includes the activation server 330 and the licensing server 340. In some embodiments, the activation server 330 and the licensing server 340 are implemented on a single server or a plurality of servers.

As used herein, the term "license" is meant to include any information pertaining to the rights that can govern the use of any digital content (e.g., which can be protected, such as encrypted, to provide protected content). In some embodiments, a license includes a key used to unlock protected digital content. For example, a license can include a key that can be used to decrypt encrypted digital content. In some embodiments, a license includes information identifying the digital content, information identifying a user, and/or information pertaining to permissions to be granted to the user. In some embodiments, information identifying the digital content can include a code associated with the digital content by the content distributor 250 or 260 so that the DRM provider (e.g., the DRM provider that facilitates the licensing server 340) is not able to determine which digital content is being accessed by the user. For example, if the digital content is an electronic book, an alphanumeric code can be assigned to the book and used to identify the book in the license transmitted to the DRM provider. The DRM provider for this embodiment is not aware of the association between the assigned code and the title of the electronic book, and therefore the DRM provider is not able to determine the title of the book being requested by the user.

In some embodiments, the licensing server 340 applies a digital signature to the unsigned license. For example, a digital signature can allow a reader application, executed on the client device 210, to authenticate the source of the signed license. As used herein, the term "digital signature" is meant to include any element of a document (e.g., the digital content is stored in a document) that can provide for authentication of the document. In some embodiments, a digital signature includes cryptographic elements. In some embodiments, a digital signature includes a string of text identifying the DRM provider. For example, a hash function can be applied to the document to generate a document fingerprint. The fingerprint can be encrypted using a private key to generate a signed fingerprint (e.g., a private key held by the DRM provider). The digital signature element can include the signed fingerprint and a public key corresponding to the private key. In some embodiments, the digital signature object is embedded inside the document. In some embodiments, the client device 210 calculates the fingerprint and compares the calculated fingerprint with results obtained by decrypting the signed fingerprint using the public key. If the calculated fingerprint matches the original fingerprint obtained by decrypting the signed fingerprint with the public key, the document can be considered to be authenticated. Of course, this is merely one example of a digital signature and authentication technique, and as will be appreciated, various other authentication techniques can also be used. As will also be appreciated, a variety of digital signature techniques can be used, such as Full Domain Hash or RSA-PSS (RSA Probabilistic Signature Scheme). Accordingly, various embodiments include any of a wide range of possible digital signature techniques. In some embodiments, the term "signed license" refers to an electronic license document to which a digital signature has been applied, and the term "unsigned license" refers to an electronic license document to which a digital signature has not been applied.

"Digital content" as referred to herein relates to information that is organized and/or formatted in a digitized form. For example, digital content can include one or more documents, visual media and/or audio media, and/or combinations thereof. Examples of digital content include video (e.g., movies, television shows, or any other type of video content), photographs, multimedia, music, electronic books (ebooks), and electronic documents. As will be appreciated, these are merely examples of the types of information that can be maintained as digital content. For example, digital content can be maintained in a compressed format to enable efficient storage of the digital content in a storage medium and/or transmission of the digital content in a communication network. In some embodiments, digital content is protected. For example, digital content can be encrypted in an effort to prevent unauthorized use. As described above, protected content can be read or otherwise accessed through the use of a key that can be included in a license. For example, a key can allow for the decryption of encrypted digital content. Digital content can be distributed via disc or other media, or can be distributed via a network, such as the Internet or a cellular network.

In some embodiments, the client device 210 includes a desktop computer system, In some embodiments, the client device 210 includes a notebook computer, a personal digital assistant (PDA), a cellular/mobile phone, a portable music player, an entertainment/game console, a personal navigation device, and/or any other computing device.

In some embodiments, the DRM provider provides a reader application 345 that is executed on/performed by the client device 210. For example, the reader application 345 can include instructions stored in a storage medium (e.g., a computer readable storage medium) that, if executed, enable user computing platform 210 to view or otherwise access digital content, such as protected content on an activated client device 210 for that protected content. For example, the reader application 345 can include an electronic book viewer. As another example, the reader application 345 can include a video and/or audio player that can be used, for example, to watch movies or to listen to music (e.g., or any other video/audio content). As will be apparent, various other reader applications can be used.

In some embodiments, the reader application 345 is downloaded from a website hosted by the DRM provider (e.g., DRM provider 230), and the DRM provider maintains records of users and/or the user's client devices 210 that have received copies of the reader application. In some embodiments, the reader application 345 checks licenses to ensure authenticity before allowing the client device 210 to access protected content.

For an example of a series of transactions demonstrating the DRM retrieval system 300, consider the following, as a user begins the process by downloading protected content 357 from the content distributor 250, as discussed above. For this example, the downloaded protected content is assumed to be an ebook. Without a license, the reader application 345 does not allow the user to view the ebook. Therefore, the user transmits a license request to the content distributor 250, and the license request is received by content distributor 250. At least in part in response to receiving the license request, content distributor 250 provides a license, for example, as discussed above. In some embodiments, the generated license includes a code identifying the title of the electronic book, information identifying the content distributor, and a listing of permissions to be granted to the client device 210 and/or to the user. The license can also include a key that can be utilized to unlock the protected digital object. For example, the key can allow the client device 210 to decrypt an encrypted digital object. In some embodiments, the license includes a text file written in an Extensible Markup Language (XML) format or any other format. As discussed above, the content distributor 250 transmits the generated, but as yet unsigned, license 342 to the licensing server 340. The licensing server 340 inspects the contents of license 342, and applies a digital signature to the license, thereby creating a signed license 344. In some embodiments, the licensing server 340 transmits the signed license 344 to the content distributor 250, and the content distributor 250 transmits the signed license to the client device 210. In some embodiments, the reader application 345 inspects the digital signature to ensure the license's authenticity and allows the user to view the ebook via a display device for the client device 210 if the license is determined to be authentic. In some embodiments, the reader application 345 utilizes a key included in the license to unlock the protected content. Also, in some embodiments, the protected content can be transferred to a second client device (not shown) for viewing by the user, and, in some embodiments, the second client device is also required to be activated, as similarly discussed herein.

In some embodiments, the activation server 330 generates an activation record for each client device. For example, the activation server receives an activation request from the client device 210, generates an activation record for the client device 210, and sends the activation record to the client device 210. In some embodiments, the activation record includes at least in part information that is unique to the client device 210 (e.g., a fingerprint, based on hardware and/or software platform information unique to the client device). In some embodiments, the reader application 345 verifies that the client device 210 has a valid activation record for that device prior to providing access to various protected content.

In some embodiments, the first set of credentials is transferred from the client device 210 to another client device. For example, the first set of credentials can be transferred using a USB memory device or using any other storage and/or network transfer technique.

In some embodiments, an activation limit is used to restrict the maximum number of devices that can be activated for a user's account with a DRM provider. In some embodiments, a maximum number of client devices can be activated for the user account for purchased content from a first vendor based on a first vendor license restriction limit and/or based on a general device activation limit for any protected content. For example, when the activation server 330 receives an activation request for a new client device for the first user, the activation server 330 determines whether an activation limit has been exceeded for the first user. If the activation limit has not been exceeded for the first user, then the activation server 330 sends an activation record to the new client device. In some embodiments, as discussed above, the new activation record is uniquely associated with the new client device.

Figure 4:
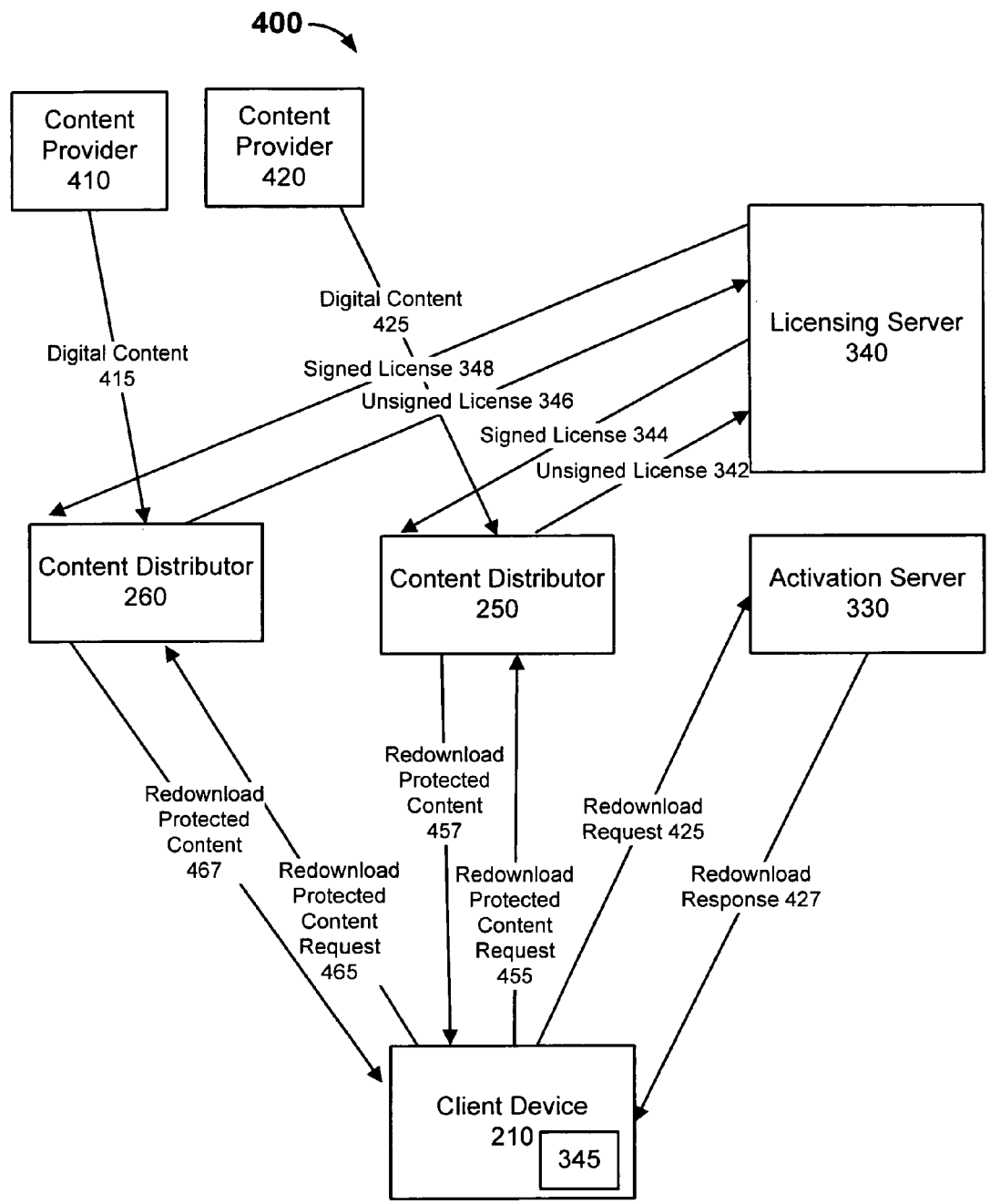
FIG. 4 is another functional diagram illustrating a digital rights management retrieval system in accordance with some embodiments.

FIG. 4 is another functional diagram illustrating a digital rights management retrieval system in accordance with some embodiments. As shown, a digital rights management retrieval system 400 facilitates a retrieval of previously downloaded/purchased content. In some embodiments, the client device 210 (e.g., content management software executed on/performed by the client device) communicates with any protected content distributor (e.g., the content distributor 250 and/or 260), authenticates itself as described above, and requests a list of resources licensed to that user (e.g., licenses to these resources and the actual content). As shown, when a previously purchased content redownload is desired/required, the client device 210 (e.g., content management software executed on/performed by the client device) sends a redownload request 425 to the activation server 330 (e.g., a centralized DRM server), and receives a redownload response 427 (e.g., including at least in part the list of previously downloaded/purchased content distributor URLs). In some embodiments, the client device 210 displays the list of content distributors from which previously downloaded/content was purchased. As also shown, the client device sends a redownload protected content request 455 to the content distributor 250, and retrieves the list of resources 457 from the content distributor 250. Similarly, the client device sends a redownload protected content request 465 to the content distributor 260, and retrieves the list of resources 467 from the content distributor 260. In some embodiments, the client device 210 displays the list of resources from each of the content distributors from which previously downloaded/content was purchased, as discussed below with respect to FIG. 6. For example, based on the list of resources from each of the content distributors, various previously purchased/downloaded protected content can be redownloaded to the client device 210. Accordingly, licenses and previously purchased content can be retrieved/redownloaded for selected (or for all) resources. In some embodiments, licenses can be created, signed, and stored in a data store (e.g. a database) maintained at/by the content distributor (e.g., content distributor 250 or 260), such as during an initial protected content download, which reduces a number of requests for licenses to the licensing server 340.

As shown in FIG. 4, the digital rights management (DRM) retrieval system 400 also includes a content provider 410 and a content provider 420. For example, the content provider 410 and/or 420 can produce ebooks or any other digital content, such as movies, music, television shows, photographs, multimedia content, and/or electronic documents. As shown, in some embodiments, the content provider 410 provides digital content 415 to the content distributor 260. In some embodiments, the content provider 410 supplies digital content 415 to any number of content distributors. Also, in some embodiments, the content distributor 260 and the content provider 410 includes the same entity. That is, a single entity can serve as both a content provider and a content distributor. Similarly, in some embodiments, the content provider 420 provides digital content 425 to the content distributor 250.

In some embodiments, a second client device that has been activated for the first user can send a redownload request, in which the redownload request includes the indication for establishing the identity of the first user. The activation server sends a redownload response to the second client device, in which the redownload response includes at least a portion of a list for the first user, as discussed above. The second client device can then send redownload protected content requests to various content distributors included on the list. For example, at least a portion of the first set of credentials can be used by the first user for redownload protected content requests sent to the first content distributor and to the second content distributor.

Figure 5:
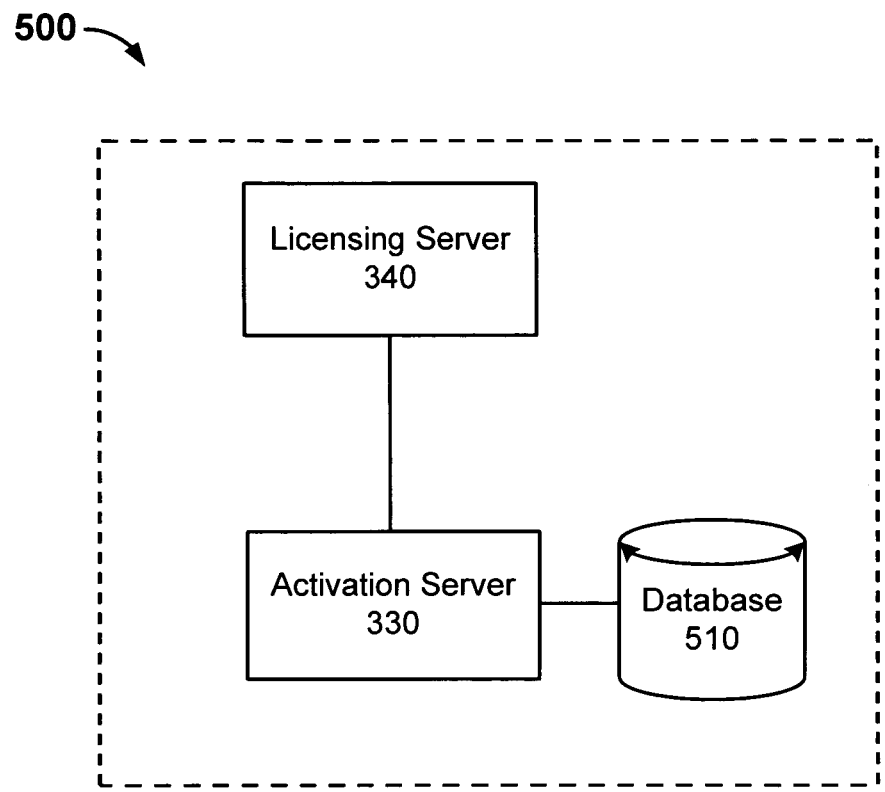
FIG. 5 is a functional diagram illustrating a DRM provider for a digital rights management retrieval system in accordance with some embodiments.

FIG. 5 is a functional diagram illustrating a DRM provider for a digital rights management retrieval system in accordance with some embodiments. As shown, a DRM provider 500 includes the activation server 330 in communication (e.g., network communication with the licensing server 340.

In some embodiments, the activation server 330 and the licensing server 340 are implemented on a single server or a plurality of servers. As also shown, the activation server 330 includes and/or is in communication (e.g., network communication) with a database 510. In some embodiments, the database 510 stores a first list of content distributors for the first user, in which the first list includes a network address (e.g., URL) for each content distributor from which the first user has downloaded/purchased protected content. In some embodiments, the database 510 stores such lists for each user's downloaded/purchased protected content activities.

Figure 6:
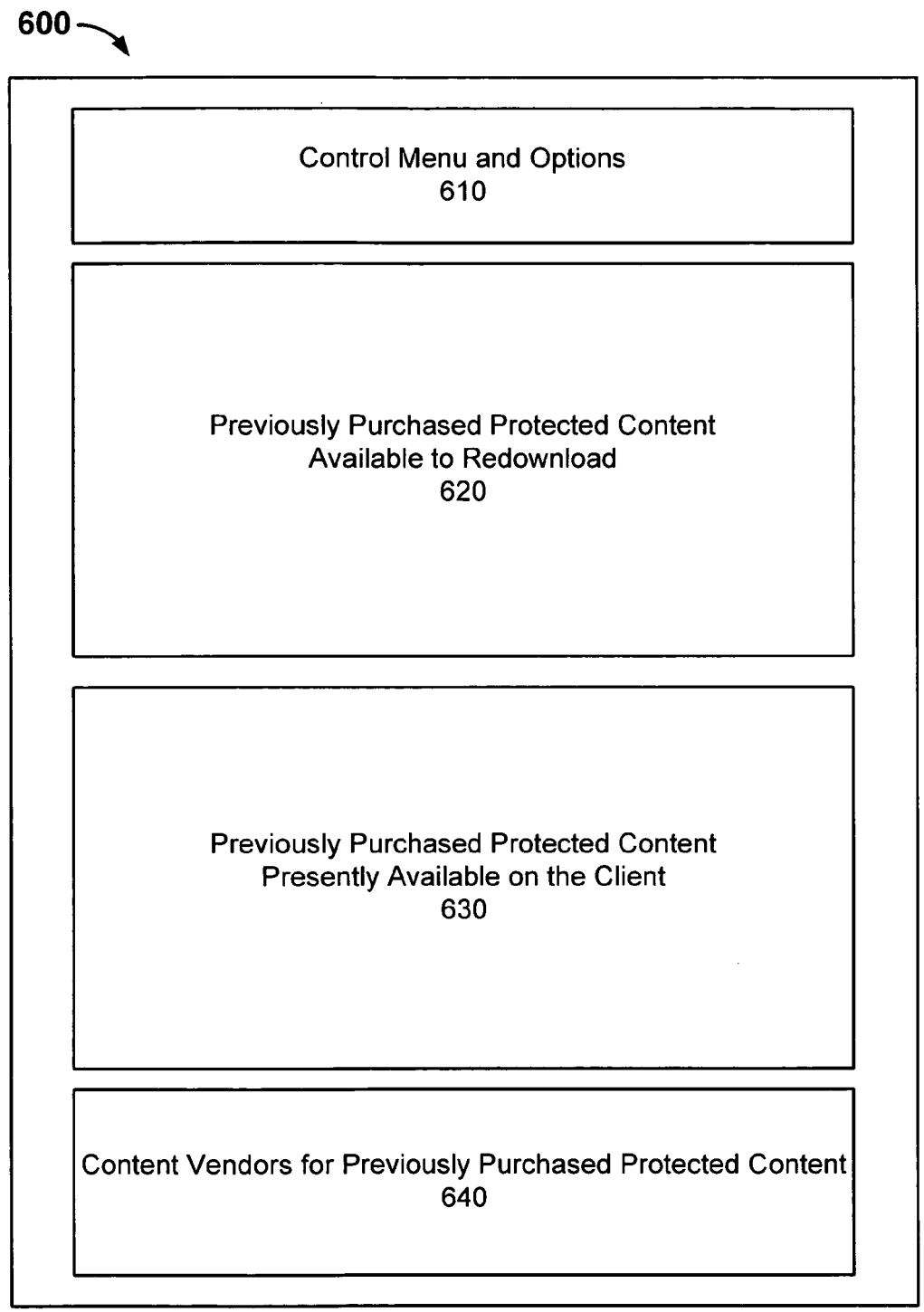
FIG. 6 is a functional diagram of a client device display for a digital rights management retrieval system in accordance with some embodiments.

FIG. 6 is a functional diagram of a client device display for a digital rights management retrieval system in accordance with some embodiments. As shown, a client device display 600 for a digital rights management retrieval system includes, for example, a set of graphical user interface (GUI) display sub-/windows and/or menus 610, 620, 630, and 640. For example, a control menu and options sub-window 610 is provided. As discussed above, previously purchased protected content available to redownload and/or to download to a new client device is provided in a sub-/window 620. Previously purchased protected content that is already stored on the client device/available on the client device is provided in a sub-/window 630. In some embodiments, as discussed above, a list of content distributors/providers (e.g., content vendors) from which protected content was previously purchased is provided in a sub-/window 640. In some embodiments, a list of previously downloaded protected content from a plurality of content distributors (available to redownload 620 and/or available on the client 630) is sorted based on one or more of the following: title, subject, type of content, artist or author, producer, date, client device, and content distributor (e.g., using the control menu and options 610). In some embodiments, the client device display 600 presents these windows and/or content in a manner that is formatted/modified based on one or more of the following: screen, interface, keyboard, and network bandwidth. For example, the client device display 600 can present these windows and/or content by implementing on one or more of the following: image(s) removal, format changes, and down sampling.

Figure 7:
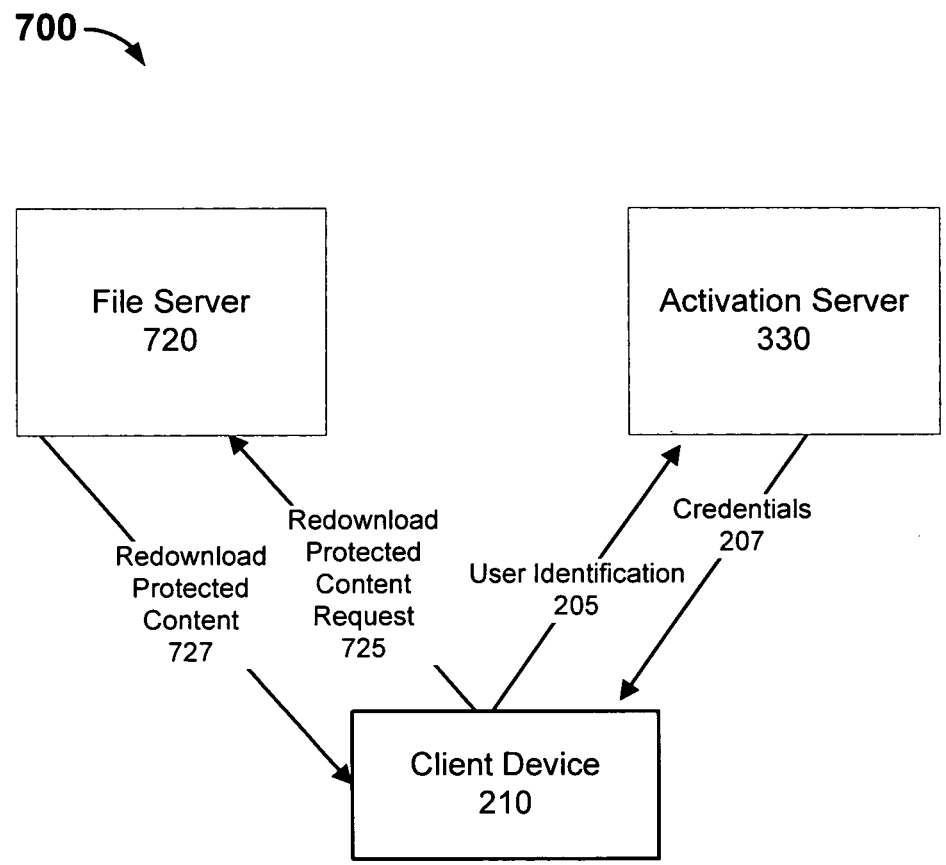
FIG. 7 is another functional diagram illustrating a DRM provider for a digital rights management retrieval system in accordance with some embodiments.

FIG. 7 is another functional diagram illustrating a DRM provider for a digital rights management retrieval system in accordance with some embodiments. As shown, a DRM provider 700 for a digital rights management retrieval system includes a file server 720 in communication (e.g., network communication) with the client device 210. In some embodiments, protected content is uploaded from the client device 210 (and/or another protected content source) to the file server 720. In some embodiments, the file server 720 receives a protected content download notification from each client device for each user with each content distributor, in which the protected content download notification includes a copy of the protected content. In this manner, the DRM provider provides a centralized data store of the previously downloaded/protected content for each of the users of the digital rights management retrieval system.

Referring to FIG. 7, the file server 720 receives a redownload protected content request 725 from the client device 210 for the first user. In some embodiments, the redownload protected content request 725 includes an indication for establishing an identity of the first user, as similarly discussed above. The file server 720 sends a redownload protected content response 727 to the client device 210. In some embodiments, the redownload protected content response 727 includes at least a portion of the previously downloaded/protected content for the first user.

In some embodiments, the file server 720 determines whether requests to store protected content are for identical protected content already stored by the file server 720 to avoid storage of duplicated protected content (or portions thereof). For example, a common encrypted payload can be determined by disregarding a unique license portion of the stored purchased content, thereby avoiding the storage of duplicate copies of the common encrypted by the file server 720. Instead, a reference, or using any other technique, can be used to allow for only a single instance/copy of the common encrypted payload to be stored by the file server 720. Accordingly, common protected content, which may be for different users, can be more efficiently stored by the file server 720.

Figure 8:
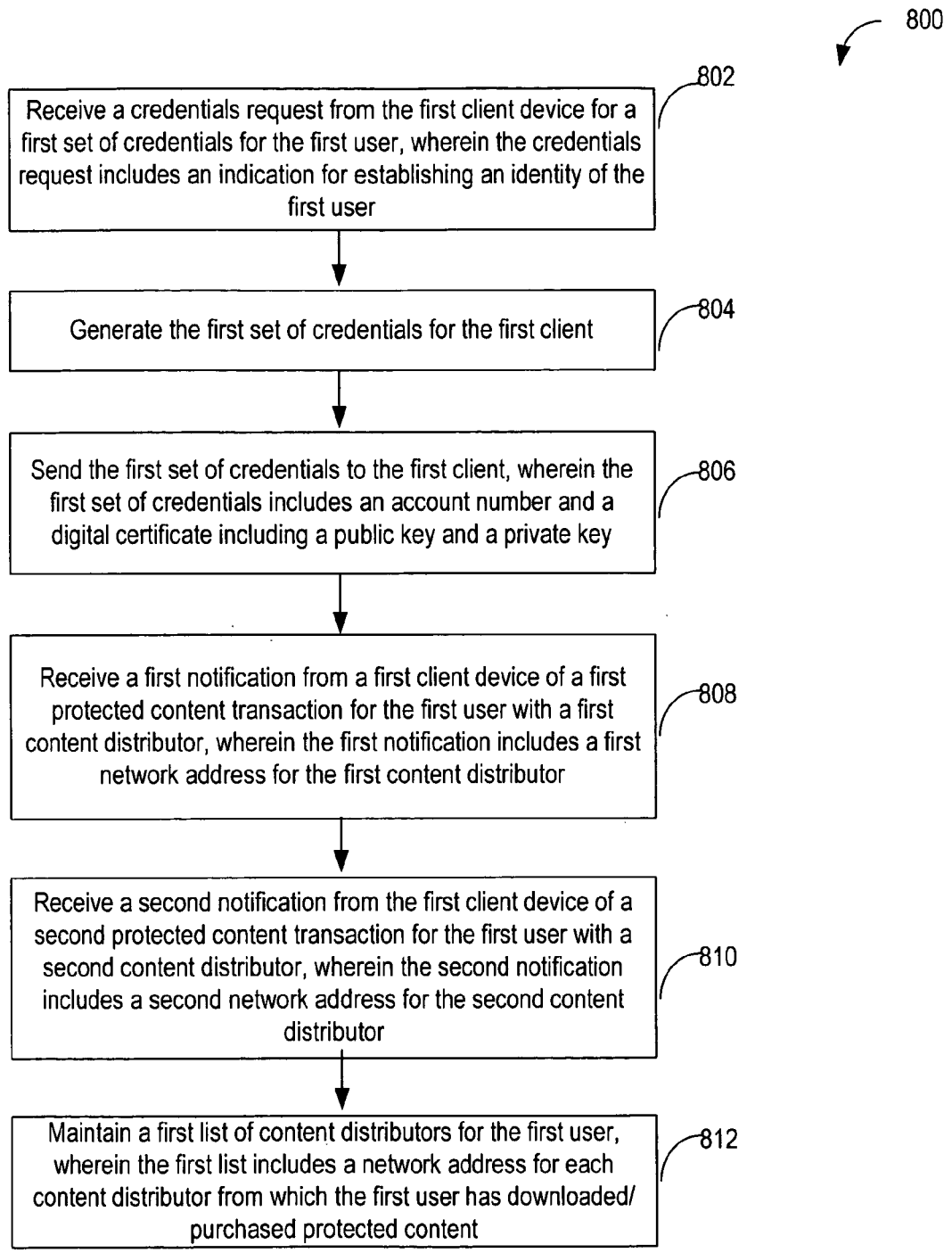
FIG. 8 is a flow chart for a digital rights management retrieval system in accordance with some embodiments.

FIG. 8 is a flow chart for a digital rights management retrieval system in accordance with some embodiments. In some embodiments, one or more of the stages described below is implemented as executable instructions performed using a processor 102 and/or computer system 100 (e.g., executed by DRM provider 230 and/or activation server 330). At stage 802, a credentials request is received from the first client device for a first set of credentials for the first user. In some embodiments, the credentials request includes an indication for establishing an identity of the first user. At stage 804, the first set of credentials for the first client is generated. At stage 806, the first set of credentials is sent to the first client. In some embodiments, the first set of credentials includes an account number and a digital certificate including a public key and a private key. At stage 808, a first notification is received from a first client device of a first protected content transaction for the first user with a first content distributor. In some embodiments, the first notification includes a first network address for the first content distributor. At stage 810, a second notification is received from the first client device of a second protected content transaction for the first user with a second content distributor. In some embodiments, the second notification includes a second network address for the second content distributor. At stage 812, a first list of content distributors for the first user is maintained. In some embodiments, the first list includes a network address for each content distributor from which the first user has downloaded/purchased protected content.

Figure 9:
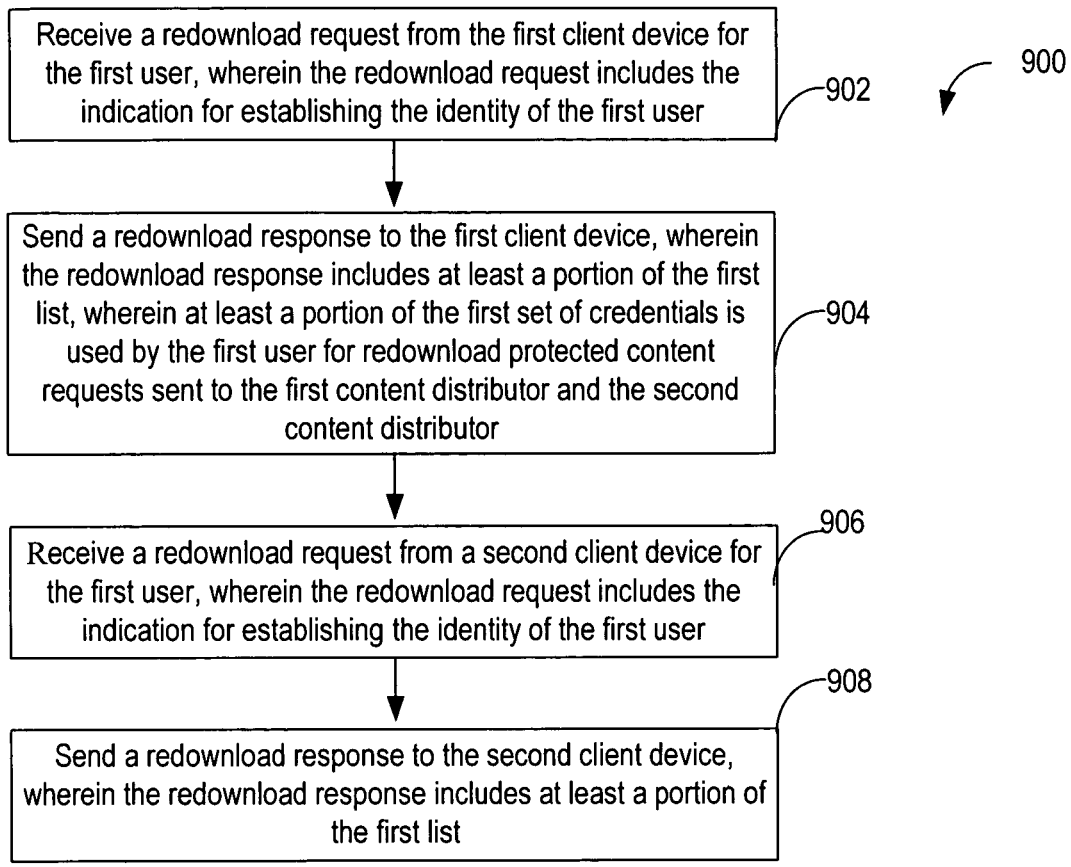
FIG. 9 is another flow chart for a digital rights management retrieval system in accordance with some embodiments.

FIG. 9 is another flow chart for a digital rights management retrieval system in accordance with some embodiments. In some embodiments, one or more of the stages described below is implemented as executable instructions performed using a processor 102 and/or computer system 100 (e.g., executed by DRM provider 230 and/or activation server 330). At stage 902, a redownload request is received from the first client device for the first user. In some embodiments, the redownload request includes the indication for establishing the identity of the first user. At stage 904, a redownload response is sent to the first client device. In some embodiments, the redownload response includes at least a portion of the first list, as similarly discussed above. In some embodiments, at least a portion of the first set of credentials is used by the first user for redownload protected content requests sent to the first content distributor and the second content distributor. At stage 906, a redownload request is received from a second client device for the first user. In some embodiments, the redownload request includes the indication for establishing the identity of the first user. At stage 908, a redownload response is sent to the second client device. In some embodiments, the redownload response includes at least a portion of the first list, as similarly discussed above.

Figure 10:
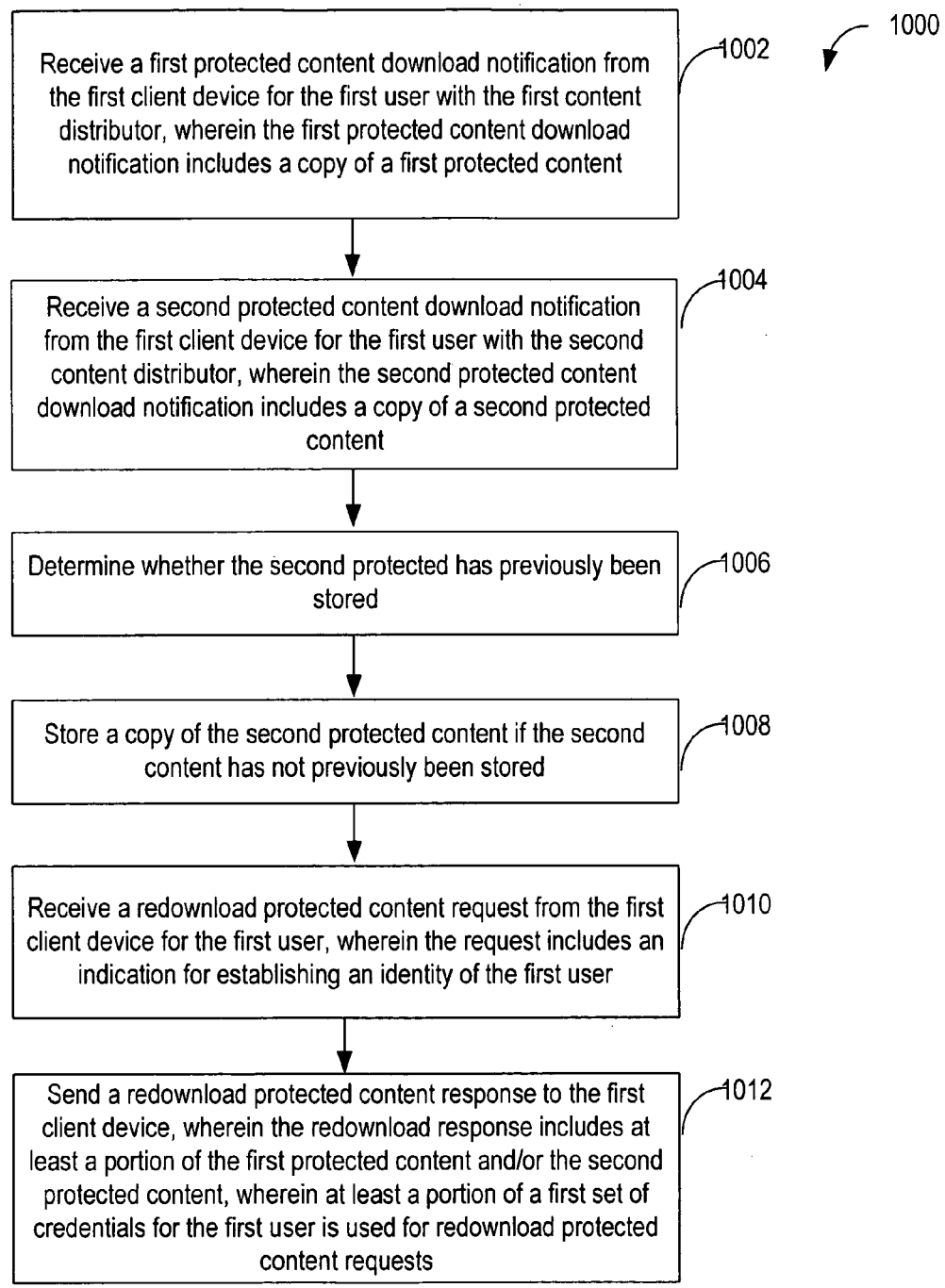
FIG. 10 is another flow chart for a digital rights management retrieval system in accordance with some embodiments.

FIG. 10 is another flow chart for a digital rights management retrieval system in accordance with some embodiments. In some embodiments, one or more of the stages described below is implemented as executable instructions performed using a processor 102 and/or computer system 100 (e.g., executed by system 700). At stage 1002, a first protected content download notification is received from the first client device for the first user with the first content distributor. In some embodiments, the first protected content download notification includes a copy of a first protected content. In some embodiments, the first protected content download notification includes a copy of an encrypted portion of the first protected content and a copy of a license portion of the first protected content that can be stored separately. At stage 1004, a second protected content download notification is received from the first client device for the first user with the second content distributor. In some embodiments, the second protected content download notification includes a copy of a second protected content. In some embodiments, the second protected content download notification includes a copy of an encrypted portion of the second protected content and a copy of a license portion of the second protected content that can be stored separately. At stage 1006, whether the second protected has previously been stored is determined. In some embodiments, determining whether the second protected has previously been stored includes determining whether the encrypted portion of the second protected has previously been stored (e.g., by comparing the encrypted portion of the second protected content with any previously stored encrypted portions of other content, such as the encrypted portion of the first protected content). At stage 1008, a copy of the encrypted portion of the second protected content is stored if the encrypted portion of the second content has not previously been stored. At stage 1010, a redownload protected content request is received from the first client device for the first user. In some embodiments, the request includes an indication for establishing an identity of the first user. At stage 1012, a redownload protected content response is sent to the first client device. In some embodiments, the redownload response includes at least a portion of the first protected content and/or the second protected content. In some embodiments, at least a portion of a first set of credentials for the first user is used for redownload protected content requests.

Figure 11:
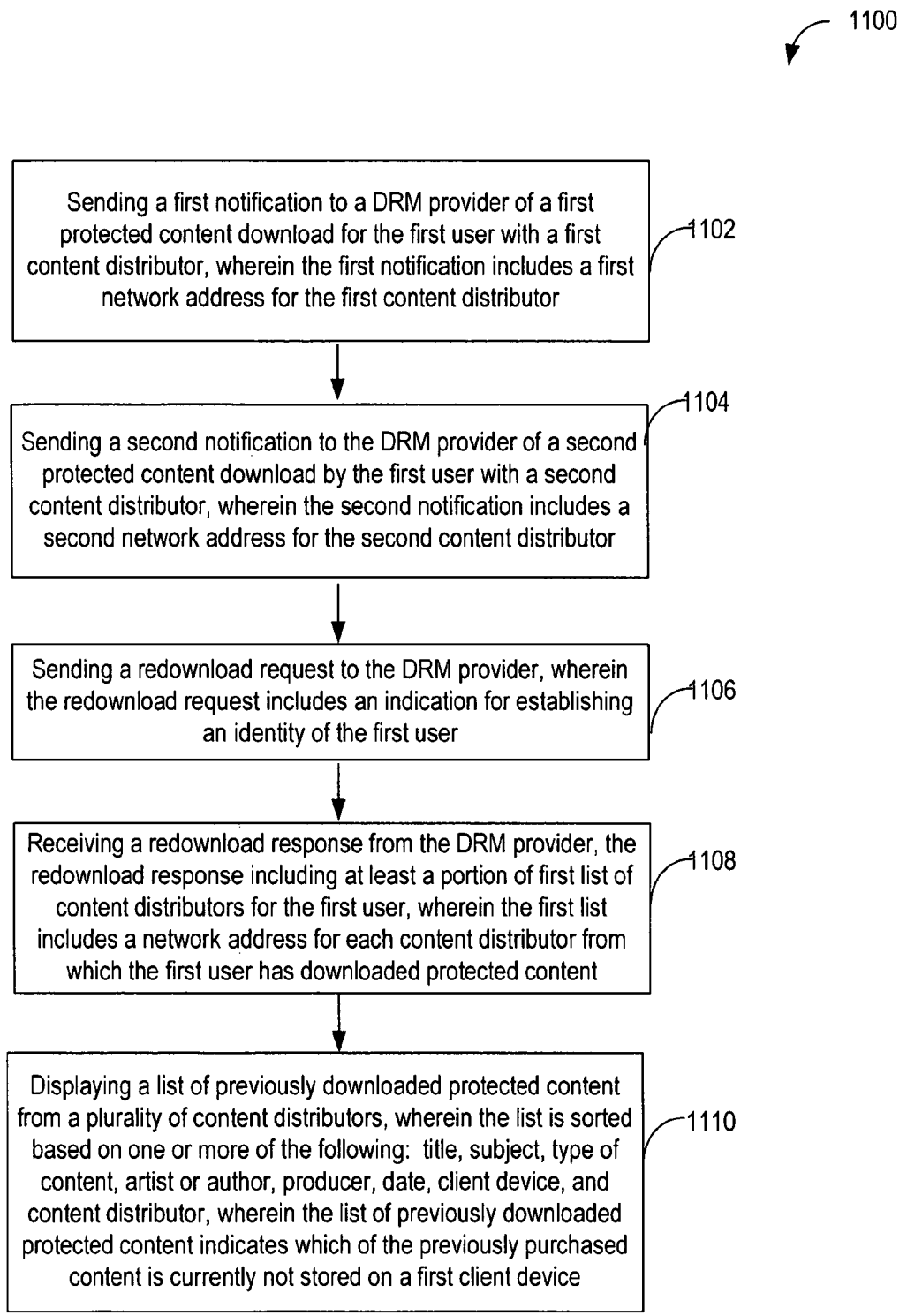
FIG. 11 is another flow chart for a digital rights management retrieval system in accordance with some embodiments.

FIG. 11 is another flow chart for a digital rights management retrieval system in accordance with some embodiments. In some embodiments, one or more of the stages described below is implemented as executable instructions performed using a processor 102 and/or computer system 100 (e.g., executed by client device 210). At stage 1102, a first notification is sent to a DRM provider of a first protected content download for the first user with a first content distributor. In some embodiments, the first notification includes a first network address for the first content distributor. At stage 1104, a second notification is sent to the DRM provider of a second protected content download by the first user with a second content distributor. In some embodiments, the second notification includes a second network address for the second content distributor. At stage 1106, a redownload request is sent to the DRM provider. In some embodiments, the redownload request includes an indication for establishing an identity of the first user. At stage 1108, a redownload response is received from the DRM provider, the redownload response including at least a portion of first list of content distributors for the first user. In some embodiments, the first list includes a network address for each content distributor from which the first user has downloaded protected content. At stage 1110, a list of previously downloaded protected content from a plurality of content distributors is displayed. In some embodiments, the list is sorted based on one or more of the following: title, subject, type of content, artist or author, producer, date, client device, and content distributor. In some embodiments, the list of previously downloaded protected content indicates which of the previously purchased content is currently not stored on a first client device.

Although the foregoing embodiments have been described in some detail for purposes of clarity of understanding, the techniques are not limited to the details provided. There are many alternative ways of implementing the techniques. The disclosed embodiments are illustrative and not restrictive.

What is claimed is:

1. A method comprising:
digitally signing, by a digital rights management system, a certificate with a private key in response to receiving a credentials request for a user from a client device via a data network, wherein the signed certificate is usable by the client device for authentication with multiple unaffiliated content distributors;
transmitting, by the digital rights management system, the signed certificate and a public key to the client device via the data network, wherein the public key corresponds to the private key;
receiving, by the digital rights management system, an unsigned license for digital content from a content distributor that has authenticated the client device using the signed certificate;
digitally signing, by the digital rights management system, the license by using the private key to encrypt a portion of the license, wherein the encrypted portion is decryptable by the client device using the public key provided to the client device with the signed certificate; and
transmitting, by the digital rights management system, the signed license to the content distributor, wherein the signed license authorizes use of the digital content by the client device.

2. The method of claim 1, further comprising transmitting an account number with the signed certificate and the public key, wherein the account number is usable for authenticating the user with the unaffiliated content distributors.

3. The method of claim 1, wherein the unsigned license comprises code for identifying the digital content at the content distributor, wherein the first code and the second code cannot be used by the digital rights management system for identifying the digital content.

4. The method of claim 1, further comprising transmitting, by the digital rights management system, a digital media application for accessing the digital content to the client device and maintaining a record associating the transmitted digital media application and the signed certificate with the user.

5. The method of claim 1, further comprising, subsequent to transmitting the signed certificate to the client device:
receiving, by the digital rights management system, a notification from the client device of a protected content transaction for the user with the content distributor, wherein the notification is associated with downloading the digital content from the content distributor and includes a first network address for the content distributor;
receiving, by the digital rights management system, an additional notification from the client device of an additional protected content transaction for the user with an additional content distributor, wherein the additional notification is associated with downloading additional digital content from the additional content distributor and includes an additional network address for the additional content distributor; and
maintaining, by the digital rights management system, a list of content distributors for the user using the notifications and the additional notification received from the client device, wherein the list of content distributors includes the network address and the additional network address.

6. The method of claim 5, wherein the network address for the content distributor and the additional network address for the additional content distributor comprises respective uniform resource locators for the content distributor and the content distributor.

7. The method of claim 5, further comprising:
receiving, by the digital rights management system, a redownload request from the client device;
transmitting, by the digital rights management system, a subset of the list of content distributors to the client device in response to authenticating the user from the redownload request, wherein the subset of the list of content distributors is usable by the client device to retrieve at least one of the first digital content from the content distributor and the additional digital content from the additional content distributor.

8. A digital rights management system comprising:
a processor; and
a non-transitory computer-readable medium communicatively coupled to the processor, wherein the processor is configured to execute computer instructions stored in the non-transitory computer-readable medium for performing operations comprising:
digitally signing a certificate with a private key in response to receiving a credentials request for a user from a client device via a data network, wherein the signed certificate is usable by the client device for authentication with multiple unaffiliated content distributors,
transmitting the signed certificate and a public key to the client device via the data network, wherein the public key corresponds to the private key,
receiving an unsigned license for digital content from a content distributor that has authenticated the client device using the signed certificate,
digitally signing the license by using the private key to encrypt a portion of the license, wherein the encrypted portion is decryptable by the client device using the public key provided to the client device with the signed certificate, and
transmitting the signed license to the first content distributor, wherein the signed license authorizes use of the first digital content by the client device.

9. The digital rights management system of claim 8, wherein the operations further comprises transmitting an account number with the signed certificate and the public key, wherein the account number is usable for authenticating the user with the unaffiliated content distributors.

10. The digital rights management system of claim 8, wherein the unsigned license comprises code for identifying the digital content at the content distributor, wherein the code cannot be used by the digital rights management system for identifying the digital content.

11. The digital rights management system of claim 8, wherein the operations further comprise transmitting a digital media application for accessing the digital content to the client device and maintaining a record associating the transmitted digital media application and the signed certificate with the user.

12. The digital rights management system of claim 8, wherein the operations further comprise, subsequent to transmitting the signed certificate to the client device:
- receiving a notification from the client device of a protected content transaction for the user with the content distributor, wherein the notification is associated with downloading the digital content from the content distributor and includes a network address for the first content distributor;
- receiving an additional notification from the client device of an additional protected content transaction for the user with an additional content distributor, wherein the additional notification is associated with downloading additional digital content from the additional content distributor and includes an additional network address for the additional content distributor; and
- maintaining a list of content distributors for the user using the notification and the additional notification received from the client device, wherein the list of content distributors includes the network address and the additional network address.

13. The digital rights management system of claim 12, wherein the network address for the content distributor and the additional network address for the additional content distributor comprises respective uniform resource locators for the content distributor and the additional content distributor.

14. The digital rights management system of claim 12, wherein the operations further comprise:
- receiving a redownload request from the client device;
- transmitting a subset of the list of content distributors to the client device in response to authenticating the user from the redownload request, wherein the subset of the list of content distributors is usable by the client device to retrieve at least one of the digital content from the content distributor and the additional digital content from the additional content distributor.

15. A non-transitory computer-readable medium storing computer instructions executable by a digital rights management system, the computer instructions comprising:
- computer instructions for digitally signing a certificate with a private key in response to receiving a credentials request for a user from a client device via a data network, wherein the signed certificate is usable by the client device for authentication with multiple unaffiliated content distributors;
- computer instructions for transmitting the signed certificate and a public key to the client device via the data network, wherein the public key corresponds to the private key;
- computer instructions for receiving an unsigned license for digital content from a content distributor that has authenticated the client device using the signed certificate;
- computer instructions for digitally signing the license by using the private key to encrypt a portion of the license, wherein the encrypted portion is decryptable by the client device using the public key provided to the client device with the signed certificate; and
- computer instructions for transmitting the signed license to the content distributor, wherein the signed license authorizes use of the digital content by the client device.

16. The non-transitory computer-readable medium of claim 15, further comprising computer instructions for transmitting an account number with the signed certificate and the public key, wherein the account number is usable for authenticating the user with the unaffiliated content distributors.

17. The non-transitory computer-readable medium of claim 15, wherein the unsigned license comprises code for identifying the digital content at the content distributor, wherein the code cannot be used by the digital rights management system for identifying the digital content.

18. The non-transitory computer-readable medium of claim 15, further comprising computer instructions for, subsequent to transmitting the signed certificate to the client device:
- receiving a notification from the client device of a protected content transaction for the user with the content distributor, wherein the notification is associated with downloading the digital content from the content distributor and includes a network address for the first content distributor;
- receiving an additional notification from the client device of an additional protected content transaction for the user with an additional content distributor, wherein the additional notification is associated with downloading additional digital content from the additional content distributor and includes an additional network address for the additional content distributor; and
- maintaining a list of content distributors for the user using the notification and the additional notification received from the client device, wherein the list of content distributors includes the first network address and the additional network address.

19. The non-transitory computer-readable medium of claim 18, wherein the network address for the content distributor and the additional network address for the additional content distributor comprises respective uniform resource locators for the content distributor and the additional content distributor.

20. The non-transitory computer-readable medium of claim 18, further comprising:
- computer instructions for receiving a redownload request from the client device;
- computer instructions for transmitting a subset of the list of content distributors to the client device in response to authenticating the user from the redownload request, wherein the subset of the list of content distributors is usable by the client device to retrieve at least one of the digital content from the content distributor and the additional digital content from the additional content distributor.

21. The method of claim 1, wherein digitally signing the license comprises:
- creating a digital fingerprint for the digital content by applying a hash function to the digital content;
- encrypting the digital fingerprint with the private key to generate a signed digital fingerprint, wherein the digital fingerprint is decryptable by the client device using the public key.

* * * * *